United States Patent [19]

Forssell

[11] 4,268,043
[45] May 19, 1981

[54] SEALING MEMBER FOR USE IN WELL SHAFTS

[75] Inventor: Bror I. Forssell, Göteborg, Sweden

[73] Assignee: RP Rorprodukter AB, Göteborg, Sweden

[21] Appl. No.: 70,324

[22] Filed: Aug. 27, 1979

[30] Foreign Application Priority Data

Sep. 15, 1978 [SE] Sweden ............................ 7809715

[51] Int. Cl.³ .............................................. F16J 15/48
[52] U.S. Cl. ...................................... 277/34; 277/29; 277/226; 166/187
[58] Field of Search .................. 277/3, 27, 28, 29, 30, 277/34, 34.3, 34.6, 70, 71, 72 R, 75, 226; 166/187

[56] References Cited

U.S. PATENT DOCUMENTS

| | | | |
|---|---|---|---|
| 1,549,168 | 8/1925 | Townsend | 277/34 X |
| 2,133,730 | 10/1938 | Brundred | 277/34.3 X |
| 2,342,884 | 2/1944 | Moore | 277/34.6 |
| 2,564,198 | 8/1951 | Elkins | 277/28 X |
| 2,845,130 | 7/1958 | Austin | 277/34 X |
| 3,173,486 | 3/1965 | Smith | 277/34 X |
| 3,926,254 | 12/1975 | Evans et al. | 166/187 X |
| 4,082,298 | 4/1978 | Sanford | 166/187 X |

Primary Examiner—Robert S. Ward, Jr.
Attorney, Agent, or Firm—Harness, Dickey & Pierce

[57] ABSTRACT

A sealing member for use in well shafts. The sealing member comprises a hose which is mounted over a tube sleeve and is sealed at its ends relative thereto. At least one pipe carrying pressurized water passes through the sleeve.

The pressurized water pipe is connected with a space between the sleeve and the hose, and the connection means includes a valve arranged to allow water to flow from the pressurized water pipe to the space but not in the opposite direction. Through this arrangement the pressurized water inside the space between the hose and the sleeve keeps the hose in sealing engagement against the wall of the well shaft.

5 Claims, 9 Drawing Figures

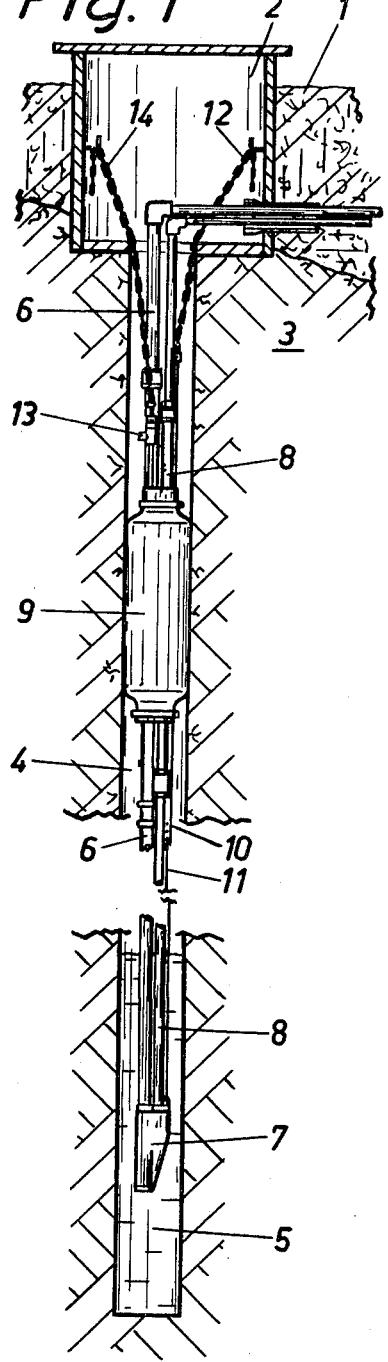
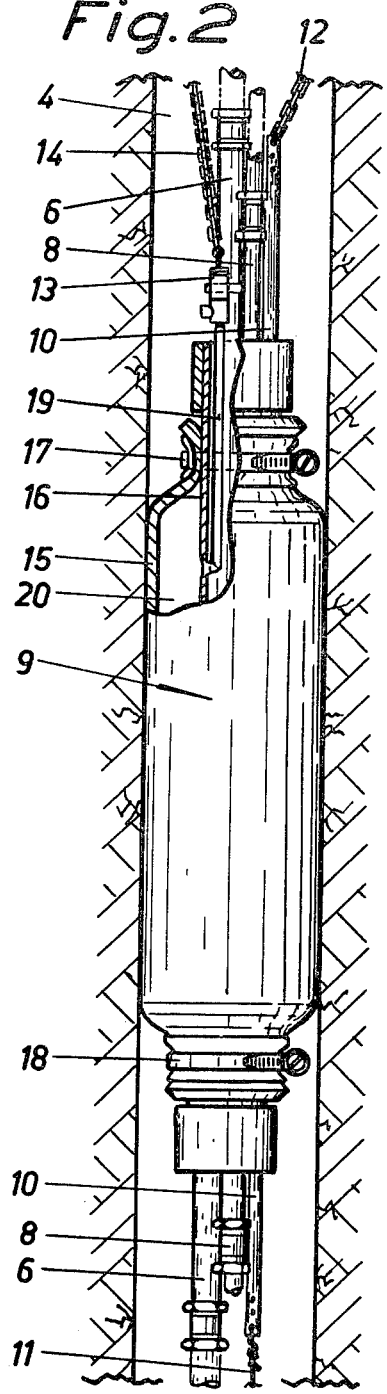

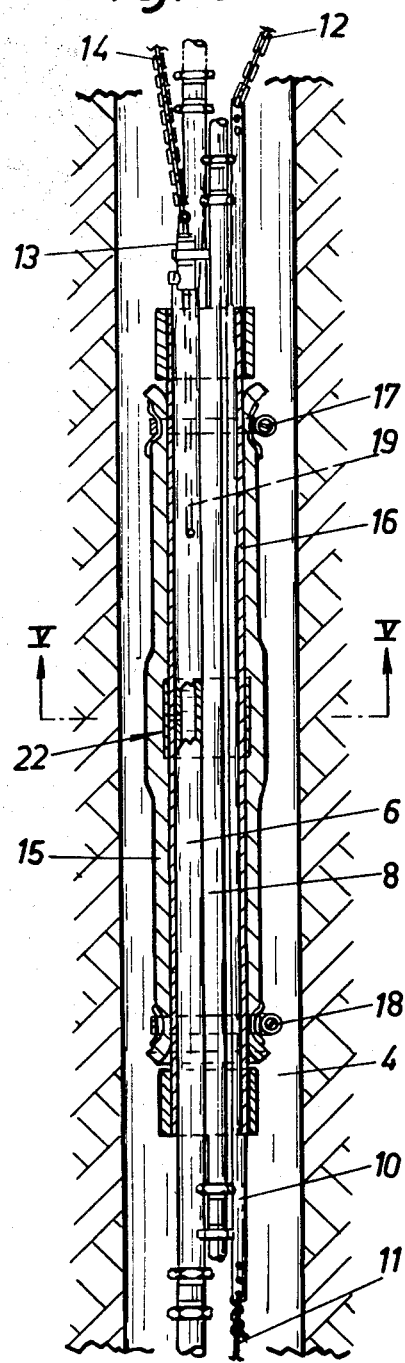
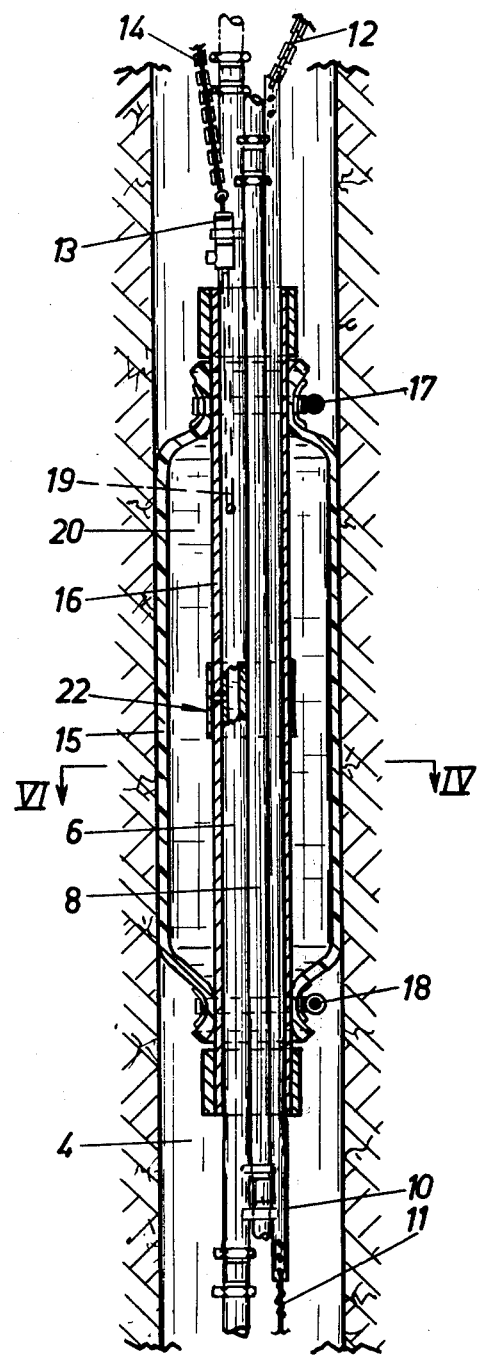

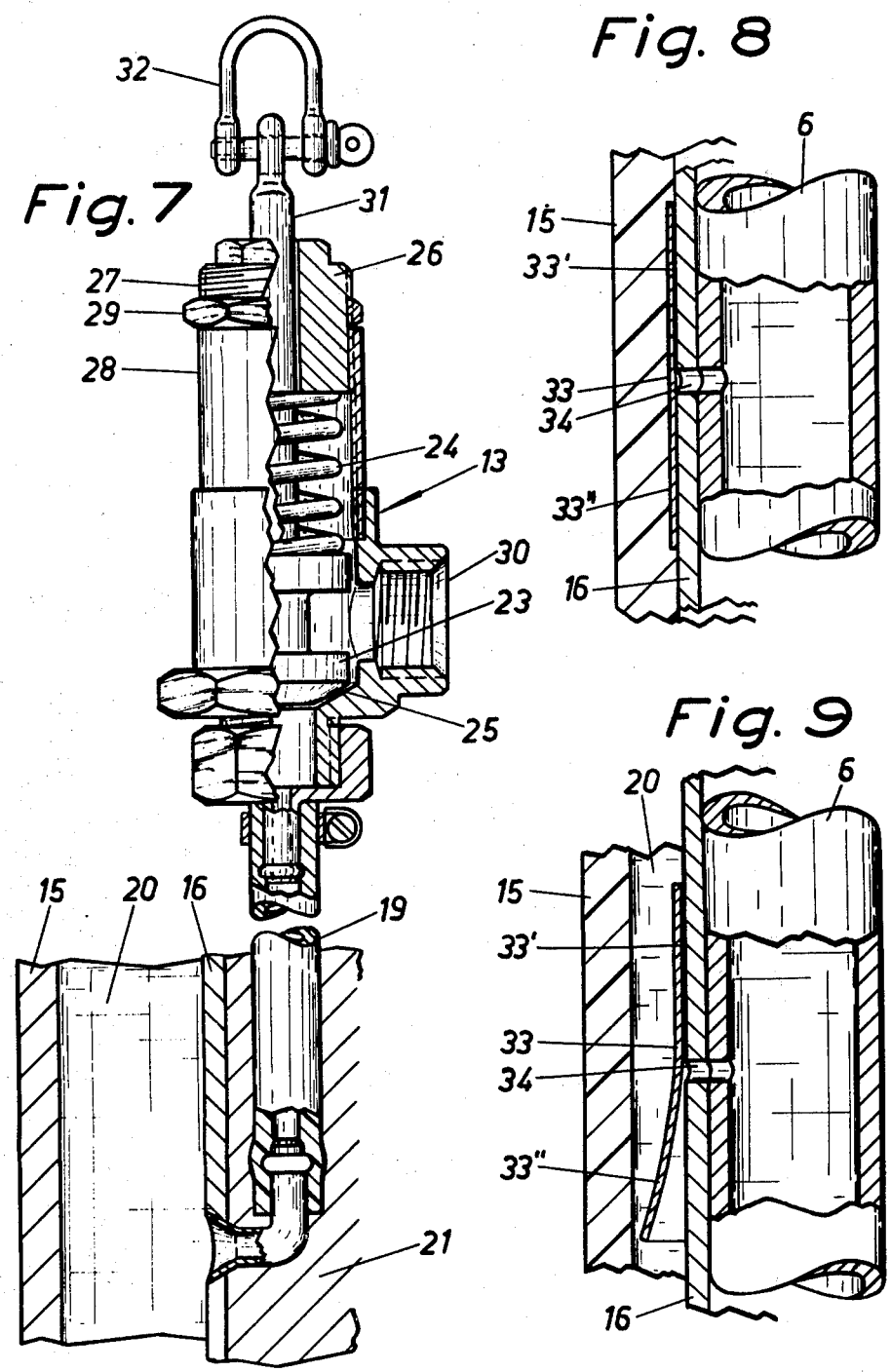

SEALING MEMBER FOR USE IN WELL SHAFTS

BACKGROUND OF THE INVENTION

The subject invention relates to a sealing member which is intended to be inserted in a well shaft and which consists of a hose which is mounted over a tube sleeve and has its ends sealed relative to the sleeve, and a pipe carrying pressurized water passing axially through said sleeve.

Prior-art sealing members of this kind include an air pipe which is connected to the space between the tube sleeve and the hose and which is intended to supply compressed air to that space. When compressed air is supplied to the space between the tube sleeve and the hose from a compressor, the hose is urged outwards into sealing abutment against the well shaft wall.

SUMMARY OF THE INVENTION

The subject invention has for its purpose to eliminate the compressor and is based on the idea of utilizing pressurized water instead of compressed air to distend the hose. The sealing member in accordance with the invention is characterized in that the pressurized water pipe is connected with a space between the sleeve and the hose and that the connection means includes a valve allowing water to flow from the pipe to said space but not in the reverse direction.

The sealing member in accordance with the invention is more simple in construction and easier to mount than are prior-art constructions. Consequently, it is less expensive than the known sealing member described in the aforegoing, since no air pipe leading to the space between the hose and the sleeve is required and since the compressor generating compressed air is also made redundant in the construction in accordance with the invention.

BRIEF DESCRIPTION OF THE DRAWINGS

The invention will be described in closer detail in the following with reference to one embodiment thereof illustrated in the accompanying drawings, wherein, FIG. 1 illustrates a well shaft in a cross-sectional view, equipped with a sealing member in accordance with the invention when mounted in the shaft, FIG. 2 illustrates the sealing member of FIG. 1 on an enlarged scale and in a partly broken view, FIG. 3 illustrates a vertical cross-sectional view through the sealing member, the hose being in its non-dilated condition, FIG. 4 is a vertical cross-sectional view through the sealing member, showing the hose in dilated condition, FIG. 7 illustrates on a still larger scale a pressure relief valve which is connected to the space between the hose and the sleeve, and FIGS. 8 and 9 illustrate on an enlarged scale a non-return valve which is connected to said space, the valve being shown respectively in its closed and in its open position.

DETAILED DESCRIPTION OF A PREFERRED EMBODIMENT

Figure 5:
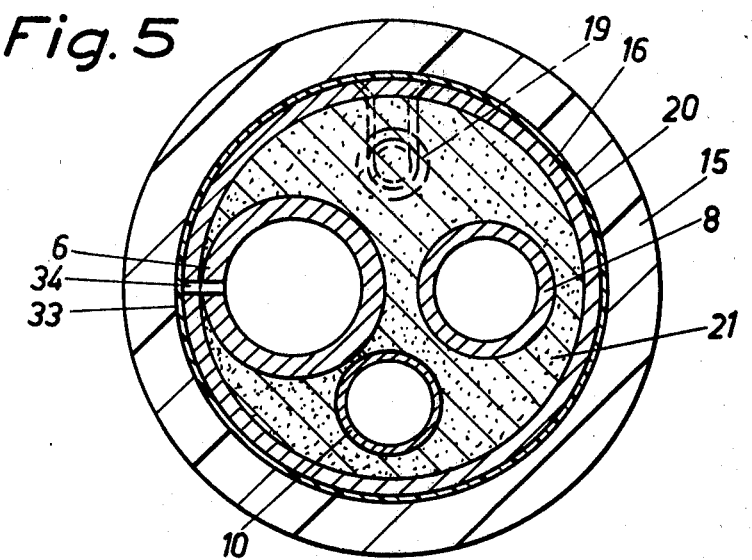
FIG. 5 is a section along line V—V of FIG. 3.

The well in accordance with FIG. 1 consists of a well portion 2 which is positioned in the layer of soil 1, and a well shaft 4 which is drilled into the rock 3. Water 5 is withdrawn from the well through an ascending pipe 6 by means of an ejector pump 7 which is driven by the pressurized water from a pipe 8.

A sealing member, generally indicated by numeral 9, is positioned in the well shaft 4. The sealing member 9, the structure and function of which are to be described in closer detail in the following, surrounding an air pipe 10 as well as the two pressurized water pipes 6 and 8. At the mouth of the air pipe 10 below the sealing member a wire 11 is attached so as to suspend the ejector pump 7. At the upper end of the air pipe 10 is attached a chain 12 which extends up to the upper end of the wall shaft and by means of which the sealing member 9 together with the pump 7 may be lifted out of the well shaft 4.

A chain 14 extends from a pressure relief valve 13 arranged on the sealing member 9 up to the well portion 3 so as to allow control and operation of the pressure relief valve 13 from above.

The sealing member 9, which is shown on an enlarged scale in FIGS. 2 to 4, consists of a hose 15 which is mounted over a tubular sleeve 16. The hose 15 is sealed relative to the sleeve 16 by means of hose clamps 17 and 18. The pressurized water tubes 6 and 8 as well as the air pipe 10 extend through the sleeve 16. Further, the sleeve houses a tube 19 which extends from the pressure relief valve 13 downwards and debouches at its lower end in a space 20 formed between the hose 15 and the sleeve 16. The remaining space inside the sleeve 16 is sealingly filled up with a cast compound 21 surrounding the pipes 6, 8 and 10.

Via apertures in the pressurized water pipe 6 and the pipe sleeve 16 and via a non-return valve 22 pressurized water can be passed into the space 20 between the hose 15 and the sleeve 16 but not in the opposite direction.

Figure 6:
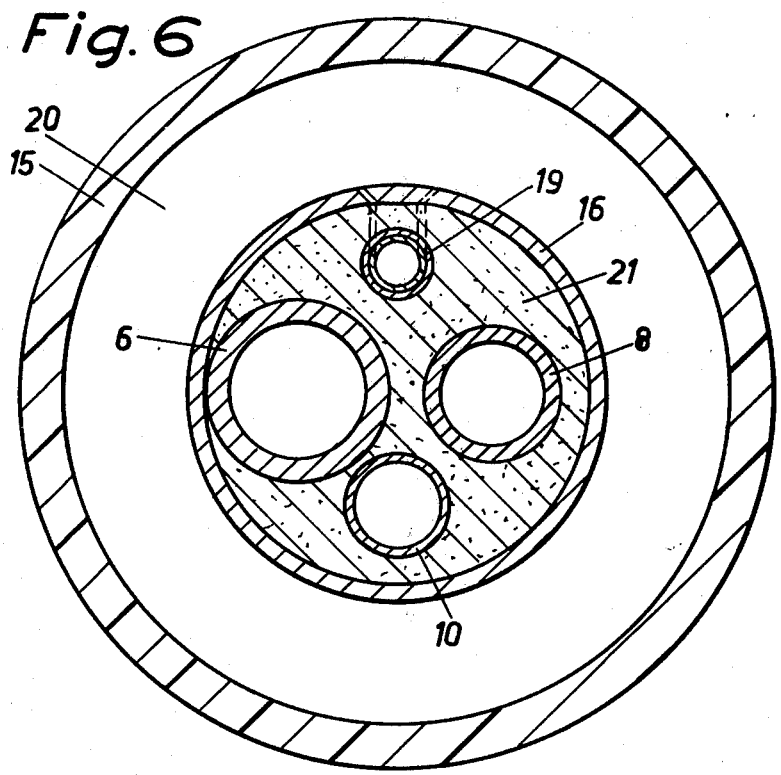
FIG. 6 shows a section along line VI—VI of FIG. 4.

FIGS. 3 and 5 show the sealing member 9 in its non-dilated condition. This is the condition of the sealing member 9 when it is to be lowered into the well shaft 4 or raised to the desired level therein. When the pressure in the water pipe 6 exceeds a pre-determined value, e.g. when the pump 7 starts its operation, pressurized water is conducted via the non-return valve 22 into the space 20, forcing the hose 15 to distend. While distending, the hose 15 is urged by the pressurized water into sealing abutment against the wall of the well shaft 4, as shown in FIGS. 4 and 6. In this position, the sealing member 9 seals off the well shaft efficiently and prevents polluted water, such as muddy surface water, sand and salty water from penetrating into the well.

FIG. 7 illustrates on an even larger scale the pressure relief valve 13 which valve communicates with the space 20 between the hose 15 and the sleeve 16 via the tube 19. A valve body 23 is biased by a spring 24 into sealing engagement against an associated seat 25 into which debouches the upper end of the pipe 19. The tension of the spring is adjustable by means of a nipple 26 which has external threads 27 thereon matching threads on a valve housing 28. The nipple is locked in the desired position by means of a nut 29. The valve housing has an outlet opening 30 through which water can escape from the space 20.

When the water pressure in the space 20 acts on the valve body 23 with a lifting power that overrides the tension of the spring 24, the valve body 23 is lifted off its seat 25 and pressurized water is allowed to flow out through the outlet opening 30. By adjusting the tension of the spring 24 it is thus possible to restrict the pressure inside the space 20 in such a manner that it cannot exceed a predetermined value (e.g. 8 kp/cm$^2$), and this value is chosen to ensure that the hose 15, the hose clamps 17 and 18 and the sleeve 16 are able to withstand the maximum pressure occurring inside the space 20. As appears from FIG. 7, the valve body 23 is connected to a connecting rod 31 which is arranged to pass freely through the nipple 26 and which is provided with an attachment means 32 at its upper end. To the latter is secured the chain 14, mentioned above, which chain extends up to well portion 2 (FIG. 1). By pulling the chain 14, it is possible to lift the valve body 23 off its associated seat 25, whereby pressure water is allowed to escape from the space 20. Obviously, the pump 7 must not be in function during this operation.

FIGS. 8 and 9 show on an enlarged scale a preferred embodiment of the non-return valve 22. The latter is of a very simple construction and merely consists of a flexible membrane 33 of natural or synthetic rubber, for instance in the form of a piece of tubing, one end portion 33' of which, e.g. the upper one, is glued to the tube sleeve 16 above a through-passage aperture 34 in the latter and which has a portion 33" which extends downwards, over the aperture 34. FIG. 8 shows the valve in the closed position, before pressurized water has entered into the pipe 6. When the pressure of the water in the pipe 6 exceeds a predetermined value, which is essentially determined by the resistance of the hose 15 to distension, the valve 22 is opened by the water pressure and water is allowed to flow into the space between the hose 15 and the sleeve 16 (see FIG. 9). When the pressures in the pipe 6 and in the space 20 are equalized, the valve 22 closes automatically and remains closed, provided the pressure in the pipe 6 for some reason does not exceed the pressure in the space 20. The sealing member 9 consequently remains in its distended condition, once it is filled with pressure water.

When one wants to remove the sealing member 9, for instance for overhaul or to change its position, the pump 7 is first closed off to eliminate water pressure in the pipe 6, whereupon the pressure-relief valve 23 is opened to let out pressure water from the space 20. When the pressure water escapes, the sealing member 9 goes clear off the wall of the well shaft and as soon as the pipes 6 and 8 have been loosened at the top, the sealing member 9 can be pulled out of the well shaft 4.

The invention is not limited to the embodiment described in the aforegoing and illustrated in the drawings but a variety of modifications are possible within the scope of the appended claims. The design of the interior of the sleeve, the cast compound and the pipes naturally need not agree with the description of the embodiment chosen as an example herein and referred to in the aforegoing. Instead of two pressure water pipes 6 and 8, used together with an ejector pump 7, it is possible to have one single pressure water pipe which extends through the sleeve together with a through-pass pipe for electric wiring leading to an electrically operated submersed pump.

Above, the sealing member has been described with reference to use in a permanent installation to prevent impurities to admix with the clean water. However, the sealing member in accordance with the subject invention is equally useful in connection with examination of possible liquids trickling into well shafts. In such cases, the sealing member is used to determine in any easy manner whether impure or polluted water seeps into the well and also to establish where such seep-through takes place.

What I claim is:

1. An improved sealing member intended for insertion in a well shaft and comprising a hose, a tube sleeve, said hose being mounted over said tube sleeve and having its ends sealed relative to said sleeve, and at least one pipe carrying pressurized water, said pipe passing through said sleeve, the improvement comprising
   a space formed between said sleeve and said hose, said space being connected with said pressurized water pipe, a valve provided in said connection and capable of allowing water to flow from said pipe to said space but not in the reverse direction.

2. An improved sealing member as claimed in claim 1, further having an air pipe passing axially through said tube sleeve, a cast compound filling up said sleeve for sealingly enclosing said pressurized waterpipe as well as said air pipe.

3. An improved sealing member as claimed in claim 2, comprising a first flexible member connected to one end of said air pipe and adapted to extend to the upper end of said well shaft, and a second flexible member connected to the opposite end of said air pipe and adapted to hang down into said well shaft, a pump in said well suspended from said second flexible member.

4. An improved sealing member as claimed in claim 1, comprising a pipe extending from said space between said sleeve and said hose, a pressure relief valve inserted in said pipe, an outlet arranged in said pressure relief valve to allow water to escape from said space when the pressure of the water in said space exceeds a certain predetermined value.

5. An improved sealing member as claimed in claim 4, comprising a pulling member, the valve body of said pressure relief valve arranged to be controlled from the upper end of said well shaft by means of said pulling member so as to move upwards away from its associated seat.

* * * * *